UNITED STATES PATENT OFFICE.

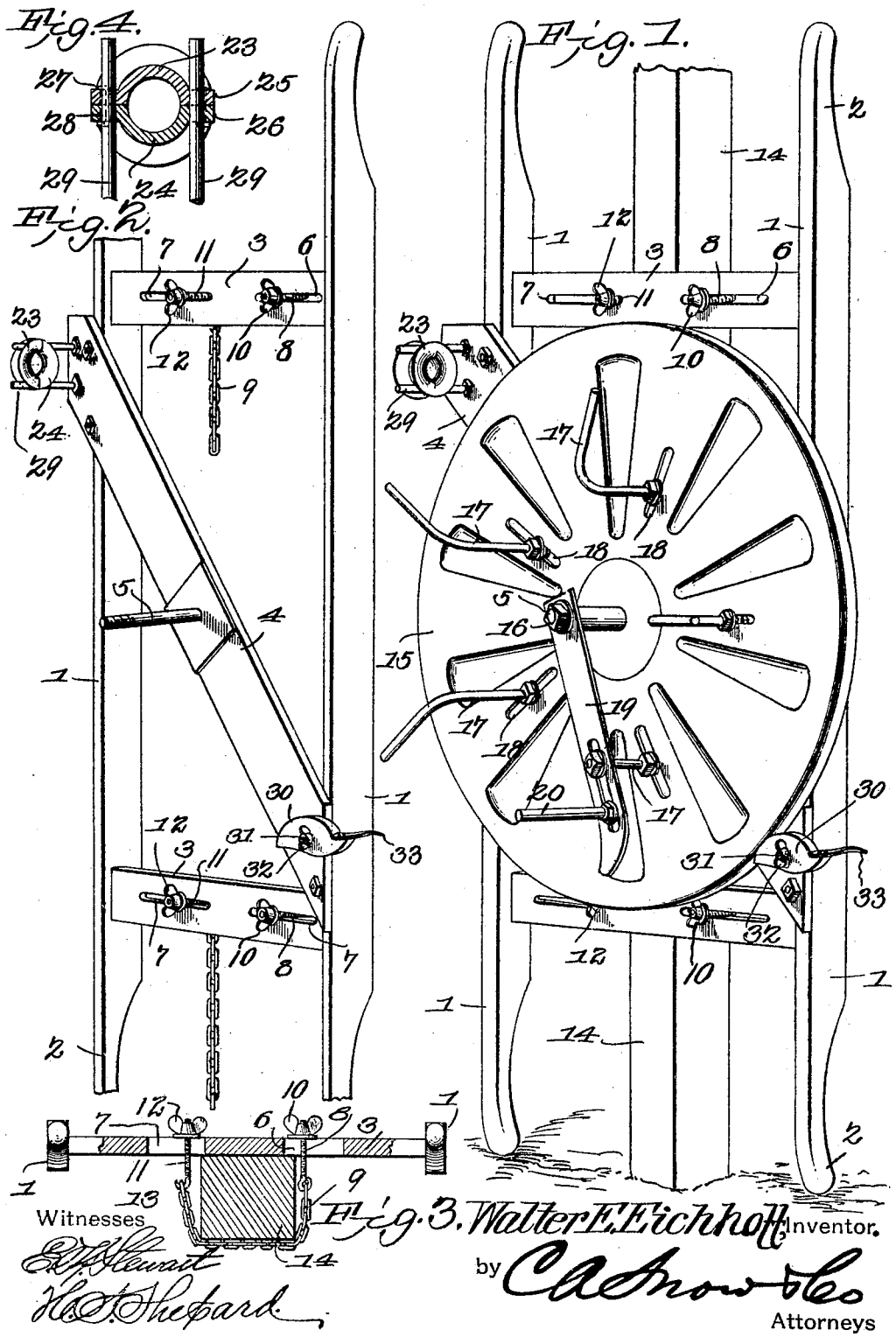

WALTER ELLSWORTH EICHHOFF, OF CAIRO, ILLINOIS.

WIRE-REEL.

No. 824,290.  Specification of Letters Patent.  Patented June 26, 1906.

Application filed October 4, 1905. Serial No. 281,335.

*To all whom it may concern:*

Be it known that I, WALTER ELLSWORTH EICHHOFF, a citizen of the United States, residing at Cairo, in the county of Alexander, and State of Illinois, have invented a new and useful Wire-Reel, of which the following is a specification.

This invention relates to reels for handling coils or bundles of wire in erecting telegraph-lines, wire fences, and the like, and has for its object to provide a novel form of truck or carrier for the support of a reel either in an upright or horizontal position, according as the device is being used to pay out or take up the wire, whereby the one reel may be employed for these two operations.

With this object in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a perspective view showing the device of the present invention supported in an upright position against a post. Fig. 2 is a perspective view of the frame of the truck or carrier with the reel removed. Fig. 3 is a plan section showing the manner of securing the device to a post. Fig. 4 is a fragmentary sectional view illustrating the reel-guide for directing the wire to the reel.

Like characters of reference designate corresponding parts in each and every figure of the drawings.

The frame of the present truck or carrier includes duplicate substantially parallel side bars 1, terminating at their opposite ends in handles 2 and connected by opposite cross-bars 3, which are located inwardly from the handles. A diagonal or obliquely-disposed bar 4 also connects the side bars and is provided at its middle with a post or standard 5, constituting a bearing for the reception of a reel. Each of the cross-bars is provided at opposite sides of its center with longitudinal slots 6 and 7. An eyebolt 8 is adjustably received in the slot 6 and has a chain 9, carried by the eye-terminal of the bolt, and a winged nut 10. In the other slot, 7, there is a bolt 11, which is provided at one end with a winged nut 12 and at its opposite end with a hook 13 for engagement with one of the links of the chain, so as to support the frame in an upright position against a suitable support— such, for instance, as a post 14, around which the chain is passed, as best shown in Fig. 3 of the drawings.

Any approved form of reel 15 is adapted to be mounted upon the post or spindle 5 and held thereon by means of a nut 16, applied to the outer end of the spindle. As shown in the present drawings, the reel is provided with an annular series of arms 17, which are adjustable in the radial slots 18 of the reel. A brace-bar 19 extends between the outer end of the post or spindle 5 and one of the reel-arms 17, there being a handle 20 provided upon the outer end of the bar 19 for use in rotating the reel upon the post 5.

At one end of the bar 4 there is a wire-guide consisting of semitubular spool members 23 and 24, which are provided with external diametrically opposite complementary ears or flanges 25 and 26, which are detachably connected by suitable fastenings 27, the flanges being provided with corresponding openings 28 for the reception of spaced rods 29, carried by the bar 4. The wire is designed to pass through the spool, which is made up of the members 23 and 24, and thence around the annularly-disposed series of arms 17, the guide being slidable upon the rods 29 to and from the frame, so as to guide the wire and to wind the latter evenly upon the reel.

At that end of the bar 4 which is opposite the wire-guide there is a brake, including a cam 30, pivoted upon a bolt 31, which pierces the bar and is held in place by a thumb-nut 32. When winding wire upon the reel, the cam is thrown into engagement with the periphery of the reel, so as to prevent unwinding of the latter under the tension of the wire. When unreeling wire, the cam is rotated to a reverse position, so as to bring the leaf-spring 33, which is carried by the cam, into frictional engagement with the periphery of the reel, so as to prevent too rapid rotation of the reel and consequent looseness of the wire thereon.

While the present device has been shown in an upright position with the handles at one end of the frame resting upon the ground and the chains 9 employed to embrace the post 14, and thereby maintain the frame in its upright position, it will of course be understood that the frame may be placed in a substantially horizontal position upon the ground or other support whenever it is desired to have the reel rotate upon a vertical axis. By this capability of the device being used in an upright position as well as in a horizontal position the reel may be employed for taking up wire as well as for paying out the same, whereby a single device has a dual capacity without requiring any adjustment or change therein.

Having thus described the invention, what is claimed is—

1. A device of the class described comprising spaced side bars, terminal cross-bars connecting the same, a brace-bar extending between the side bars and located between the cross-bars, a reel-seat carried by the middle of the brace-bar, a wire-guide carried by one end of the brace-bar, and a reel-engaging brake carried by the other end of the brace-bar.

2. A device of the class described comprising spaced side bars, terminal cross-bars connecting the same, a brace-bar connecting the side bars and located between the cross-bars, a reel-seat carried by the middle of the brace-bar, a wire-guide carried by one end of the brace-bar, a reel-engaging brake carried by the other end of the brace-bar, and means carried by the cross-bars for securing the device in an upright position to a support.

3. A device of the class described comprising a pair of spaced side bars, a brace-bar connecting the side bars, a reel-seat carried by a portion of the brace-bar, a wire-guide at one side of the reel-seat, and a reel-engaging brake located at the opposite side of the seat.

4. A device of the class described comprising spaced side bars terminating in handles, terminal cross-bars connecting the side bars at the inner ends of the handles and provided with longitudinal slots, bolts adjustable in the slots and provided with clamping-nuts, chains carried by certain of the bolts, hooks provided upon the other bolts for engagement by the chains, a brace-bar extending between the side bars and located between the cross-bars, a reel-seat carried by the middle of the brace-bar, a wire-guide carried by one end of the brace-bar, and a reel-engaging brake carried by the other end of the brace-bar.

In testimony that I claim the foregoing as my own I have hereto affixed my signature in the presence of two witnesses.

WALTER ELLSWORTH EICHHOFF.

Witnesses:
A. HERBER,
H. H. ALBERT.